United States Patent [19]

Brown

[11] Patent Number: 4,578,136

[45] Date of Patent: Mar. 25, 1986

[54] ADHESIVE PRODUCTS

[75] Inventor: Barry D. Brown, Reno, Nev.

[73] Assignee: The Datak Corporation, Guttenberg, N.J.

[21] Appl. No.: 608,266

[22] Filed: May 7, 1984

Related U.S. Application Data

[63] Continuation of Ser. No. 371,339, Apr. 28, 1982, abandoned.

[51] Int. Cl.[4] .............................................. B32B 31/00

[52] U.S. Cl. ..................................... 156/249; 40/2 R; 156/215; 156/267; 428/40; 428/42; 428/43; 428/194; 428/201; 428/202; 428/914

[58] Field of Search ....................... 156/215, 249, 267

[56] References Cited

U.S. PATENT DOCUMENTS

| | | | |
|---|---|---|---|
| 2,372,994 | 4/1943 | Welch | 206/820 |
| 2,567,067 | 9/1951 | Grupp et al. | 117/3.6 |
| 2,831,277 | 4/1958 | Strachan | 40/2 |
| 2,914,166 | 11/1959 | Bihler | 206/820 |
| 2,940,868 | 6/1960 | Patchell | 427/208.6 |
| 3,568,829 | 3/1971 | Brady | 206/56 |
| 3,706,626 | 12/1972 | Smith et al. | 428/42 |
| 3,799,829 | 3/1974 | Heatwole | 156/235 |
| 3,869,333 | 3/1975 | McMaster | 161/39 |
| 3,872,969 | 3/1975 | Edison | 206/532 |
| 4,128,954 | 12/1978 | White | 428/42 |
| 4,309,468 | 1/1982 | St. Aubin | 428/42 |
| 4,391,853 | 7/1983 | Pointon | 427/152 |

OTHER PUBLICATIONS

Datak Flexy-Marker for wire.

*Primary Examiner*—George F. Lesmes
*Assistant Examiner*—P. R. Schwartz

[57] ABSTRACT

Each disclosed wire marker or other adhesive product includes a pressure-sensitive adhesive portion or applique that has a readily peelable bond to the release surface of a carrier sheet. A tab extends from an extremity of the applique, to be torn away when the applique is adhered to a receiving surface, due to a weakening formation between the tab and the applique. Wire markers have an elongated wire-marking portions divided into segments by connections that are progressively weaker in the order of their distance from the tab. Where made by screen printing, the same operation that defines the outlines of the adhesive products also produces the weakening formations.

16 Claims, 3 Drawing Figures

FIG. 1
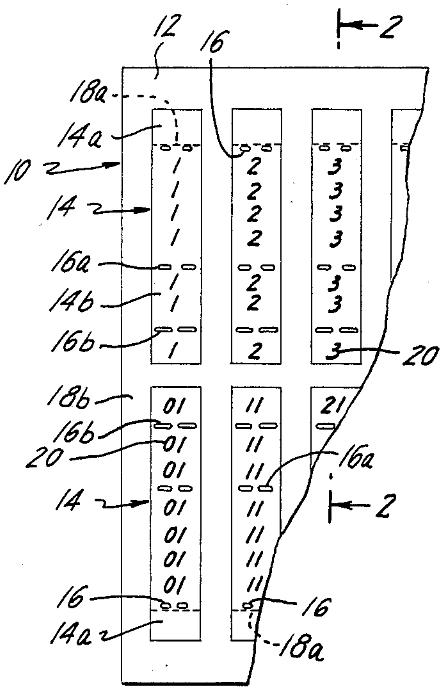
FIG. 2
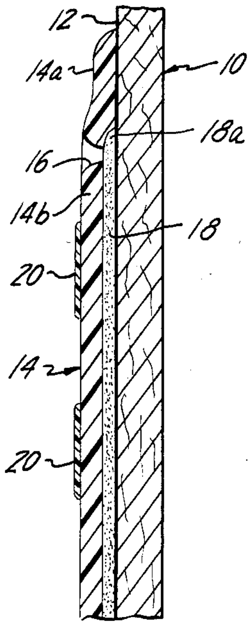
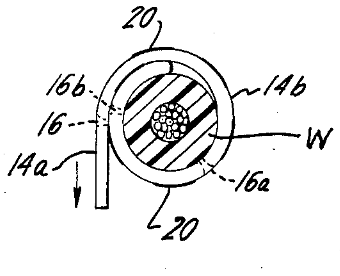
FIG. 3

ADHESIVE PRODUCTS

This application is a continuation of application Ser. No. 371,339 filed Apr. 23, 1982, now abandoned.

The present invention relates to wire markers and the like.

A conventional wire marker is a wire-identifying strip commonly bearing duplicate characters repeated at intervals along one face of the strip and having a layer of pressure-sensitive adhesive covering its opposite face. In use, the strip is wound around insulated wire as an identification. Wire markers may be applied to one or both ends of a length of wire to facilitate tracing a circuit.

There is a comon problem in handling wire markers. The adhesive entirely covers one side of the wire marker so that, after it is wound on a wire, it will be securely adhered to its very end. Unless special precaution is taken, contaminating substances may be picked up by the adhesive from the user's fingers. Contamination may degrade or even nullify the adhesive, either initially or as time passes. Those who use wire markers often have oily fingers, and oil notoriously impairs most pressure-sensitive adhesives.

General-purpose pressure-sensitive labels are subject to the same problem, but in the case of labels there is less risk of the user's fingers contaminating the adhesive, and limited degradation of a label's adhesive usually is of little or no concern. In a common practice, pressure-sensitive labels are mounted on a protective carrier sheet cut into two parts. The user can fold the label at the cut, with the parts of the carrier sheet facing outward. By "working" the carrier-sheet parts in relation to each other, corners of the carrier-sheet parts become free to be grasped and stripped away from the adhesive label.

If the user were to peel away both parts of the carrier sheet, the sticky surface of the label would inevitably be touched as the label is handled in applying it to a receiving surface. However the user may first peel away one part of the carrier sheet to bare only part of the adhesive surface. The part of the label that still has its carrier-sheet backing can be grasped while the bared-adhesive portion of the label is applied to the receiving surface. The user then peels away the remaining portion of the carrier sheet and presses the remainder of the label against the receiving surface.

Wire-marking strips having an all-over coating of pressure-sensitive adhesive may be imagined as having a conveniently large carrier sheet in common for a portion of each of the wire markers and a separate piece of protective carrier sheet for a portion of each wire marker for grasping and safely handling one wire marker at a time. However the manufacture and use of such wire markers would evidently entail certain difficulties in practice.

An object of the present invention resides in providing novel wire markers and the like that avoid the foregoing difficulties and limitations.

The illustrative embodiment of the invention shown in the accompanying drawing and described in detail below comprises a one-piece carrier sheet bearing many wire markers. Each wire marker is a unitary strip of material that includes a wire-marking strip, and a tab that extends integrally from an end of the wire-marking strip. A weakening formation is provided in the strip of material as the demarcation between the tab and the wire-marking strip. Conventionally, duplicate wire-identification characters are repeated at intervals along the wire-marking strip, and they may be made in distinctive colors, for wire identification. A layer of pressure-sensitive adhesive entirely covers one surface of the wire-marking strip. To special advantage at least part of the tab is free of adhesive. The wire-marking strips have an easily peelable bond to the release surface of the carrier sheet.

The user can readily lift the tab or the adhesive-free portion of the tab of any selected wire marker, to peel it away from the carrier sheet, leaving the other wire markers undisturbed for later use. Holding only the tab, the user wraps one or more convolutions of the wire-marking strip around the wire, to or past the weakening formation between the tab and the wire-marking strip. Tension is developed to tear away the tab. The same tension develops pressure of the adhesive against the underlying surface, to the very end of the torn strip.

The tab is removed in the final effort of applying the wire-marking strip. No tool is used and no separate operation is involved. The wire-marking strip, with its all-over layer of bared but uncontaminated adhesive, is left securely adhered in place, up to its torn end.

It is not necessary for the entire tab to be free of adhesive. Indeed, by deliberately extending the adhesive from the wire-marking strip across the weakening formation onto part of the tab, assurance is had that all of the applied wire marking portion will be adhesive-bearing and that its very end will become adhered.

Wire markers are applied to insulated wire of various sizes. A further feature of the invention resides in adapting the novel wire markers to use with various diameters of wire. This is realized by incorporating weakening formations not only between the tab and the wire-marking strip, but by incorporating one or more secondary weakening formations at other points along the wire-marking strip. The wire marker then comprises at least three segments in endwise alignment with one another, including the tab and two or more wire-marking segments.

For large-diameter wire, the whole length of the wire marking strip is wrapped around the wire before the tab is torn away. For slender wire, only a segment of the wire-marker strip may be wrapped around the wire, to or just beyond one of the secondary weakening formations. The portion of the wire-marking strip beyond the secondary weakening formation together with the tab is then torn away, the removed part in effect becoming an extended tab. The torn end of the wire-marking strip remaining on the wire becomes securely adhered. The serially related segments of the strip are defined by weakening formations that leave transversely rupturable connections that are successively weaker in tension in the order of their distances from the tab end of the strip.

While the invention has features of special importance in wire markers as indicated above, certain aspects extend to other pressure-sensitive adhesive articles such as labels and adhesive bandage strips. All such products would then have a tear-away tab extending from a part which may be called an "applique" for lack of a better term. Lifting of the tab from the carrier sheet is facilitated by making it wholly or partly adhesive-free while the applique has its entire area covered by a layer of pressure-sensitive adhesive no part of which need be touched in applying it to a receiving surface.

As a further feature of the invention the novel wire markers and similar adhesive products are produced by screen printing so that their weakening formation(s) can be provided in the same operation that establishes their outlines.

The nature of the invention and its further novel features and advantages will be better appreciated from the following description of an illustrative embodiment, and from the accompanying drawings.

In the drawings:

FIG. 1 is an enlarged front view of a sheet of novel wire markers;

FIG. 2 is a greatly enlarged fragmentary cross-section of the sheet in FIG. 1 at the plane 2—2.

FIG. 3 is an enlarged cross-section of a piece of insulated wire bearing an applied novel wire marker, prior to removal of its tab.

In the drawings, card or sheet 10 is a conventional form of carrier sheet for labels having pressure-sensitive adhesive. Sheet 10 has a release surface 12 that forms an easily peelable bond to pressure-sensitive adhesive. The sheet may be a plastic that has release properties or it may be treated as by a coating, a lamination or impregnation to provide release properties.

In the illustrated embodiment, strips 14 are of coherent polymeric material, polyvinyl chloride film for example. Each "strip of material" is divided into "a tab" 14*a* and "a wire-marking strip" 14*b*. A primary weakening formation 16 such as the twin apertures shown provides a demarcation between the tab and the wire-marking strip. Secondary weakening apertures 16*a* and 16*b* appear at two other places along the wire-marking strip. Repetitions of the same character occur at intervals along the wire-marking strip.

Three segments of wire-marking strips 14*b* are defined by weakening formations 16, 16*a* and 16*b*. These segments and the tab as a further segment of the wire marker extend serially in endwise alignment with one another. One segment of one of the strips has a single "3", the next segment has two "3's" and the third segment has four "3's". All three segments can be wrapped around a heavy wire, or a selected one segment may be appropriate, or two adjacent segments can be used, depending on the wire size and the desired number of convolutions of the wire marker.

A layer of pressure-sensitive adhesive 18 underlying each wire-marking strip 14 is strongly bonded to the strip and has an easily peelable bond to the release surface of carrier sheet 10.

Wire markers 14 are spaced apart on the card in this example, although they could be edge-to-edge (suitably divided from each other) and would then occupy all or nearly all of the area of the sheet. However, it is desirable for the sheet to have a bare area next to the tabs, so that the user can scrape the sheet toward an edge of the tab for initially lifting the tab. The spaces between each wire marker and the next one on the sheet facilitate access to the tabs for lifting the tabs in this manner.

In a preferred manufacturing process, stripes of an adhesive precursor are applied to a carrier sheet and the stripes of film-forming material containing migratory tackifier are applied to the adhesive precursor, as disclosed in detail in a patent application of Barry D. Brown and David W. Pointon Ser. No. 371,338 filed concurrently herewith and entitled Adhesive Articles And Their Manufacture (now abandoned) all of which is hereby incorporated by reference Ser. No. 371,338. In an example, the wire markers are formed on casting paper 6.5 mil (147 micron) thick coated with a "solvent" silicone release agent that develops a "high" (i.e. easy) release surface with no loss of the release agent into the adhesive. An adhesive precursor is applied to the casting paper, having a formulation of 30% non-volatile poly (n-butyl methacrylate) resin in ethylene glycol mono ethyl ether (Dupont Elvacite 2044) with the addition of 0.1% silicone oil to prevent the wet adhesive precursor from being repelled by the silicone release surface of the casting paper. The adhesive precursor is screen-printed on the casting paper in stripes and dried at 70° C. for one minute to a dry film thickness of 0.3 mil (7.5 micron). The stripes are carried to ends 18*a* that are slightly past the point at which the tab on the coherent strip of the wire marker is to tear or break from the tab so that there will be no possibility of the torn end of the wire marking strip lacking adhesive despite manufacturing tolerances.

Coherent polymeric film former is applied next. In this example, it is screen-printed in stripes (as shown) in register with the adhesive precursor stripes. Most of each tab length is allowed to extend beyond the adhesive precursor onto the release surface of the carrier sheet, where it develops a readily breakable non-tacky bond. The part of the tab that is left free of pressure-sensitive adhesive can be readily lifted from the carrier sheet when a wire marker is to be used. The entire wire marker is thus produced in one piece and is joint-free. Apertures 16, 16*a* and 16*b* are produced as part of the screen-printing operation that establishes the outline of the coherent polymeric strips.

A formulation for the film former consists of 50 parts of poly (vinyl chloride) dispersion resin, 1.5 parts of Cd/Ba stabilizer, 4.0 parts epoxidized soybean oil, 12 parts of Di-2-ethyl hexyl phthalate plasticizer and 16 parts of butyl benzyl phthalate as the migratory tackifier for the adhesive precursor, and 17 parts of pigment.

The silk-screened film former is gelled at 120° C. for 40 seconds to give a dry film of gauge 3.0 mils (75 microns). Finally, the identification characters are screen-printed onto the strips of film using commercially available black ink, for example Black Gloss Vinyl ink reference 8016 made by Tibbets-Westerfields Paint Co., Inc.

The tackifier migrates from the film former into the adhesive precursor and converts the latter into pressure-sensitive adhesive, but only in the areas occupied in common by strips 14 and the adhesive precursor. Strips 14 are thin polymeric films and are extremely supple. Most of each tab 14*a* is free of adhesive, but the tabs are nonetheless held against card 10 by a non-tacky bond that is readily released by slight scraping. After having been released once, a tab does not adhere again and remains free for the user to grasp.

Alternative methods of producing similar wire markers are contemplated. For example, pre-printed strips formed of slit or die-cut sheets or bands of plastic such as PVC may be laminated to a card bearing a coated band of pressure-sensitive adhesive. Weakening formations 16,16*a* and 16*b* may be pre-punched in those pre-printed strips. The same relationship should be established as that described above between the ends 18*a* of the adhesive and the primary weakening formations 16.

In this just-described alternative, the strips 14 would ordinarily be made edge-to-edge so that there would be no exposed "overlap" area 18*b* between the strips 14. If strips 14 were of some special shape interfering with their being arranged edge-to-edge (as in the case of labels with free-form outline) they could still be die-cut.

The scrap material between such die-cut outlines could remain, to cover the adhesive-coated spaces between adjacent labels. Otherwise (if there were exposed tacky areas 18b) tack-reducing material such as powder could be applied. Sheets of release paper could be used, if needed, to cover each sheet of wire markers or labels in a stack.

As a further alternative a band of material that is to form the wire markers or the like can have its back surface coated with adhesive within limits 18a, leaving the band of material bare outside those limits. The adhesive-coated band may then be laminated to a carrier sheet 10. Either before or after lamination, or partly before and partly after lamination, strips 14 may be formed by die-cutting the band, and weakening formations 16, 16a and 16b may be provided. The indicia may be printed as required, either before or after the laminating step.

In use, any wire marker 14 may be selectively removed from card 10. The user scrapes the surface of card 10 across an edge of tab 14a to lift the tab where it is not bonded by adhesive to sheet 10. Strip 14 is peeled free of sheet 10, and wire-marking strip 14b is wrapped about insulated wire W. The user only grasps the tab, so that there is no occasion for any of the pressure-sensitive adhesive becoming contaminated after it has been removed from the carrier sheet and until it has been applied to the wire. The end of strip 14 remote from tab 14a initially engages the wire and the wire marker is then wound around the wire (FIG. 3). Finally tab 14a is torn away from the rest of the strip. This rupture occurs at weakening formation 16. Due to the stress developed in tearing the tab away, caused by pulling the tab in the direction of the arrow in FIG. 3, the very end of the wound strip is pressed against the wire and is securely bonded by the adhesive. That adhesive is presumably in virgin condition and its bond to thė wire or the underlying convolution of the wire marker is secure throughout.

The weakening formations in the form of apertures 16, 16a and 16b form demarcations that subdivide the wire marking strip into three segments as indicated above, so that the tab and the segments of each continuous coherent strip has, correspondingly, three connections that are readily torn or breakable. The connection at formation 16b is weaker in tension than that at formation 16a, and the latter in turn is weaker in tension than the connection that joins tab 14a to the wire marking strip 14b. Differences in weakness of the connections between the segments of the strip may be produced by making apertures 16, 16a and 16b of different sizes as shown in FIG. 1.

When the single-character segment remote from the tab is to be used alone, it can be wrapped on a wire and when the tab is pulled, the entire unwound portion of the strip tears away at formation 16b.

If section 14b is to be used alone, the single-character segment can be grasped and torn away while the user also grasps the tab. Afer wrapping the two-character segment on a wire, the remainder of the wire marker tears away when the tab is pulled. The four-character segment can be readied for use and then used alone in like fashion. Of course, any combination of successive segments can be chosen and used in a similar manner. All the connections are, of course, amply strong for the strip to be held taut as it is wound on and adhered to the wire's insulation or to an underlying convolution of the wire marking strip itself.

Wire markers made as described above can be made in a range of colors, and in that case, the characters may be superfluous.

By screen-printing the film-former to create the strips of wire-marking material, the resulting strips are quite thin yet require no die-cutting (which could be difficult in the case of very thin sheets) and the wire markers do not project noticeably from the surface of the marked wire, thus minimizing the danger of a wire marker being scuffed off the wire accidentally.

The foregoing illustrative embodiment of the invention is readily amenable to varied modification and it is adaptable to other applications by those skilled in the art. Consequently, the invention should be construed broadly in accordance with its true spirit and scope.

What is claimed is:

1. An article of manufacture, including a carrier having a release surface, and a marker including a one-piece, relatively long and narrow strip of material comprising at least three serially related segments including a first-end segment and at least two additional segments divided by graded weakening formations that result in transversely rupturable connections between the segments that are all successively weaker in tension in the order of their distances from the first-end segment, each of said additional segments bearing pressure-sensitive adhesive and being adhered thereby to said release surface, whereby, after the marker has been peeled from the carrier by a user who grasps only said first-end segment, and after the segment remote from said first-end segment has been adhered to a receptor and retained thereon, the unadhered segments of the marker can be torn away from the adhered segment by directly pulling only the grasped first-end segment of the marker.

2. An article of manufacture as in claim 1 wherein the first-end segment of the marker is a tab and wherein each other segment is a marking segment having identifying means.

3. An article of manufacutre as in claim 2 wherein the marking segments bear identifying characters as the identifying means.

4. An article of manufacture as in claim 2 wherein at least an end portion of the first-end segment of the marker is free of said pressure-sensitive adhesive and has a weak bond directly to said release surface.

5. An article of manufacture as in claim 1, wherein all of said pressure-sensitive adhesive on the strip is in contact with said release surface.

6. An article of manufacture as in claim 4, wherein said one-piece strip of material including the weakenings therein is a product produced in situ by the screen printing process.

7. An article of manufacture as in claim 2 wherein at least an end portion of the first-end segment is directly opposed to the carrier and is free of said pressure-sensitive adhesive.

8. An article of manufacture including a carrier having a release surface, and a wire marker including a one-piece relatively long and narrow strip of material bearing pressure-sensitive adhesive and adhered thereby to said release surface, said strip comprising at least three serially related segments including a first-end segment and at least two additional segments divided by graded weakening formations that result in transverse rupturable connections between the segments that are successively weaker in the order of their distances from the first-end segment whereby, after the wire marker has been peeled from the carrier by a user who grasps only said first-end segment, and after the segment remote from said first-end segment has been adhered to a receptor and retained thereon, the unadhered segments of the wire marker can be torn away from the adhered segment by directly pulling only the grasped first-end segment of the wire marker, said first-end segment of the wire marker being a tab and each other segment being a wire-marking segment having wire-identifying means, at least an end portion of the first-end segment being directly opposed to the carrier and being free of said pressure-sensitive adhesive, and all of said pressure-sensitive adhesive borne by the wire marker being adhered to said release surface.

9. An article of manufacture as in any of claims 4, 5, 6, 1 or 7 wherein plural markers as aforesaid are adhered side by side to the release surface of said carrier.

10. An article of manufacture as in any of claims 2, 4 or 1 wherein said strip of material is joint-free and said serially related segments are in endwise alignment with one another and said weakenings are localized reductions in transverse cross-section of the strip.

11. An article of manufacture, includng a carrier having a release surface and a marker including a one-piece long and narrow strip continuously of the same material comprising plural serially related segments in endwise alignment with one another including a first-end segment and at least two additional segments divided by graded localized reductions in cross-section of the strip leaving transversely rupturable connections between the segments that are successively weaker in tension in the order of their distances from the first-end segment, each of said additional segments bearing pressure-sensitive adhesive and being adhered thereby to said release surface whereby, after the marker has been peeled from the carrier by a user who grasps only said first-end segment, and after the segment remote from said first-end segment has been adhered to a receptor and retained thereon, the unadhered segments of the marker can be torn away from the adhered segment by directly pulling only the grasped first-end segment.

12. An article of manufacture as in any of claims 4, 5, 6, 1 or 11 wherein plural markers as aforesaid are adhered to said carrier side-by-side and at least the first-end segments thereof are spaced apart for individual selective access.

13. An article of manufacture as in claim 11 wherein all of the connections between the segments comprising the marker are progressively weaker in the order of their distances from the first-end segment.

14. An article of manufacture as in claim 11, wherein said one-piece strip of material including said localized reductions in cross-section is a product produced in situ by the screen-printing process.

15. An article of manufacture as in any of claims 1, 2, 6 or 13 wherein said at least two additional segments include a third additional segment adhered to the carrier by pressure-sensitive adhesive and extending serially from said two additional segments at the end thereof remote from said first-end segment, said third additional segment being divided from the next-adjacent one of said two additional segments by a weakening formation that defines one of said transverse rupturable connections.

16. The method of marking a wire using the marker of claim 1 or 11, comprising the steps of grasping only the first-end segment of the marker and peeling the marker from the carrier, adhering the end segment of the strip remote from said first-end segment to the wire to be marked while grasping only the first-end segment so as to leave the grasped segment and at least one of said additional segments unadhered, and longitudinally pulling the grasped segment so as to tear the unadhered segments away from the adhered segment.

* * * * *